US011890745B1

(12) United States Patent
Oglesbee, Jr.

(10) Patent No.: US 11,890,745 B1
(45) Date of Patent: Feb. 6, 2024

(54) FOLDING WIDE-TOP SAWHORSE

(71) Applicant: Edward Oglesbee, Jr., Claxton, GA (US)

(72) Inventor: Edward Oglesbee, Jr., Claxton, GA (US)

( * ) Notice: Subject to any disclaimer, the term of this patent is extended or adjusted under 35 U.S.C. 154(b) by 0 days.

(21) Appl. No.: 17/979,106

(22) Filed: Nov. 2, 2022

(51) Int. Cl.
*B25H 1/06* (2006.01)

(52) U.S. Cl.
CPC .................................... *B25H 1/06* (2013.01)

(58) Field of Classification Search
CPC ........... B25H 1/06; B25B 11/00; B25B 11/02
USPC .......................... 269/289 R, 20, 21; D6/641
See application file for complete search history.

(56) References Cited

U.S. PATENT DOCUMENTS 5,379,816 A * 1/1995 Charlton ................. B25H 1/14
144/287

* cited by examiner

*Primary Examiner* — Don M Anderson
*Assistant Examiner* — Caleb Andrew Holizna
(74) *Attorney, Agent, or Firm* — Lyman Moulton, Esq.; Moulton Patents, PLLC

(57) ABSTRACT

The complete sawhorse is the only product of its kind that offers a foundational table that enables users to cut any specific material that is needed regardless of its weight, size, or texture. This unprecedented product is uniquely designed with a saw line and level bar to allow for a more precise and accurate sawing process, to address commercial or DIY necessities.

12 Claims, 1 Drawing Sheet

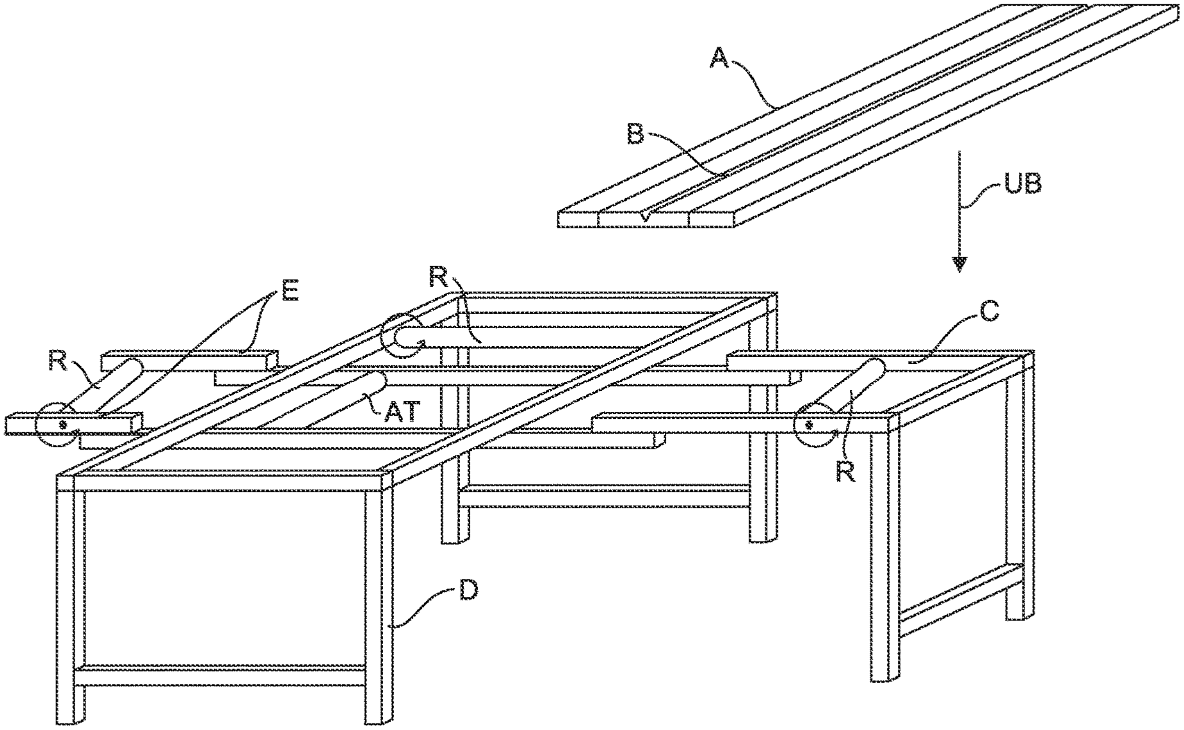
A
B
UB
E
R
R
AT
C
R
D

FOLDING WIDE-TOP SAWHORSE

BACKGROUND

Sawhorses are a common tool used in the carpentry industry, mostly in performing everyday tasks. A recurring complaint from carpenters working with current designs of sawhorses, however, is the lack of mobility, adjustability, and strength of their sawhorses which prevents them from handling heavy duty machinery or when cutting heavier materials, a frequent requirement in their work. There have been no products available as original equipment or as an aftermarket to address this problem.

An apparatus to assist with carpentry in supporting wood or other heavy objects that is easily maneuverable, adjustable and have a large weight bearing ability is not being met by any known device or system at present. There have been no products available as original equipment or as an aftermarket to address this problem either.

SUMMARY OF THE INVENTION

The main purpose of folding wide-top sawhorse is to provide users with a multi-functional folding wide-top novel sawhorse table.

BRIEF DESCRIPTION OF THE DRAWINGS

FIG. 1 is a left perspective view of the folding wide-top sawhorse in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a left perspective view of the folding wide-top sawhorse showing: wooden table top referenced as A, saw line referenced as B, extendable sliding arms referenced as C, and foldable/folding legs referenced as D, in accordance with an embodiment of the present disclosure. The saw line B is supported by a saw guide for straight cuts in embodiments of the disclosure. The table top A with saw lines is depicted in relative placement by the arrow UB in relation to the disclosed sawhorse but can also be turned ninety degrees to set atop sliding arms C and sliding extensions E in embodiments. Attachment support tube AT is also shown in relative placement. Rollers R slide the table top or stock along the surface of the disclosure. Sliding extensions E are shown to support larger work pieces. Dimensions are specified below.

The present disclosed folding wide-top sawhorse, also known as "The Complete Sawhorse" offers a modem accessory that allows individuals to cut through any and all materials and includes built-in features that users would otherwise have to add or build, to allow for productive and efficient operation, at all times. The complete sawhorse introduces a novel heavy duty wooden table top with folding legs and extendable sliding arms to enable users to adjust and modify their sawhorses to cater to their exact preferences. The complete sawhorse ensures a fully operational sawhorse that eliminates the need for users to resort to other alternatives when sawing through diverse materials and elements which helps to improve time management.

The disclosure enables a user to work off two or three boards operating as a compound saw horse or as a two in one saw horse. Therefore, the disclosure can fold up and take less storage room and less operational space. The disclosure is a central structure for all other parts. The base is 20 by 48 inches with two attachment tubes 20 inches long on the underside. The attachment tubes are one and a half inches aluminum stock but can also be made out of plastic and heavy materials. Aluminum is preferred for carpenter work and heavy metals for a machine shop.

The central structure of the disclosure has four legs comprising one inch stock, the base one inch and all other components are one inch stock. Embodiments include attachment tubes larger from one and one half inch. Two extended bars at five feet long hold plywood and long boards with 35 inch legs of two each. There are two short extra tubings at 12 inches long for either side. Two feet long extensions provide more room. At the base of the sawhorse are two boards 8 by 48 for cutting support with 4 inches between the boards for cutting space if needed to be replaced with saw guides for straight cuts.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A saw horse comprising:

a table top;

a top frame comprising a topside and an underside and two lateral sides and two end sides each attached to a pair of folding legs;

a pair of extension arms directly attached to the cross frame lateral arms at an end portion thereof and having a topside and a bottomside directly attached to the underside of the top frame in an orthogonal relation thereto;

a pair of extension arms attached to the cross frame lateral arms at and end portion thereof and having a topside and a bottomside attached to the cross frame topside in a slideable relation thereto and comprising an end pair of folding legs, wherein the topside of the top frame and the topside of the extension comprise a flush surface support for the table top and a work piece.

2. The saw horse of claim 1, further comprising an attachment support tube as a support cross member for the top frame between the two lateral sides.

3. The saw horse of claim 2, wherein the attachment support tube comprises metal or heavy rigid materials in relation to wood such as dense plastics.

4. The saw horse of claim 1, further comprising a roller attached between the pair of extension arms and having a roller surface flush with the topsides of the top frame and extension.

5. The saw horse of claim 1, further comprising a second pair of extension arms attached to the cross frame lateral arms at another end portion thereof.

6. The saw horse of claim 5, wherein the second pair of extension arms comprise a topside and a bottom side attached to the cross frame topside in a slideable relation thereto.

7. The saw horse of claim 5, further comprising a roller attached between the pair of second extension arms and having a roller surface flush with the topsides of the top frame and the extension.

8. The saw horse of claim 1, wherein the table top further comprises a saw line groove defined in the table top for a saw blade clearance there into.

9. The saw horse of claim 1, wherein each pair of folding legs locks parallel to the top frame and at ninety degrees to the top frame.

10. The saw horse of claim 1, wherein the cross frame two lateral sides extend beyond the top frame two lateral sides.

11. The saw horse of claim 1, wherein the table top is free floating in relation to the top frame and the pair of extension arms.

12. The saw horse of claim 1, wherein the table top is moveable across the flush surface support on either the top frame or the pair of extension arms.

* * * * *